Patented July 18, 1950

2,516,002

UNITED STATES PATENT OFFICE 2,516,002

HALOGENATED DERIVATIVES OF LYSERGIC ACID, ISOLYSERGIC ACID, AND THEIR DERIVATIVES, AND A PROCESS OF MAKING SAME

Albert Hofmann and Franz Troxler, Basel, Switzerland, assignors to Sandoz A. G., Basel, Switzerland No Drawing. Application July 16, 1948, Serial No. 39,174. In Switzerland July 22, 1947

12 Claims. (Cl. 260—236)

The preparation of halogen compounds of lysergic acid, isolysergic acid and their derivatives, such as esters or amides (e. g. ergot alkaloids), and of the dihydro compounds of these acids and their derivatives, has hitherto encountered great difficulties on account of the great sensitiveness of these materials, particularly their sensitiveness to acids and oxidising agents. Reagents, which for example evolve free halogen or hydrogen halide, react with the same with extensive decomposition and with resinification of the starting materials. For this reason, although some halogenated compounds have been obtained in very poor yields, the products have been ill-defined.

According to the present invention it has now been found that well defined monohalogenated compounds of the above named acids and their derivatives, in which the halogen is attached to the indol nitrogen atom, can be obtained by dissolving the compound to be halogenated in an inert solvent and causing it to react with an amide or imide of a carboxylic or sulphonic acid which has been halogenated on the nitrogen atom.

As halogenating agents for this purpose there are suitable for example N-bromacetamide, N-bromophthalimide, N-bromo-p-toluenesulphonamide, N-bromo-di-p-toluenesulphonimide, N-bromo- or N-chloro-benzoic acid sulphimide and N-bromo- or -iodo-succinimide.

The halogenation of the lysergic acids or their derivatives can advantageously take place according to this invention in an inert solvent such as dioxane, ether, carbon tetrachloride and the like, and can be carried out at room temperature or at a somewhat higher temperature. The new halogeno-compounds can most advantageously be separated from accompanying materials by means of the chromatographic adsorption method of their solutions. In this way the new compounds are obtained as oily substances which can, however, be converted into the crystalline state by dissolution in a suitable solvent such as acetone, benzene, chloroform, ether or methanol, from which solutions they can be obtained in well developed crystalline forms, in some cases containing crystallisation solvent.

When carrying out the method of our present invention, the halogen atom enters onto the indol nitrogen atom. The new compounds correspond to the general formula $C_{15}H_{14}N_2Hal.COR$ and $C_{15}H_{16}N_2Hal.COR$. In these formulae R stands for groups such as OH, $OCH_3$, etc, as seen from the following tables:

TABLE I $C_{15}H_{14}N_2Hal.COR$
- R=OH, bromo-lysergic acid
- R=$OCH_3$, bromo-lysergic acid methyl ester
- R=$N(C_2H_5)_2$, bromo-lysergic acid diethylamide
- R=$C_{17}H_{20}O_4N_3$, brom-ergotamine
- R=$C_{19}H_{24}O_4N_3$, brom-ergocristine
- R=$C_{15}H_{24}O_4N_3$, brom-ergocornine
  brom-ergocorninine
- R=$C_3H_8ON$, brom-ergobasine
- R=$C_{17}H_{20}O_4N_3$, iod-ergotamine

TABLE II $C_{15}H_{16}N_2Hal.COR$
- R=$OCH_3$, bromo-dihydrolysergic acid methyl ester
- R=$C_{17}H_{20}O_4N_3$, brom-dihydroergotamine
- R=$C_{19}H_{24}O_4N_3$, brom-dihydroergocristine
- R=$C_{17}H_{20}O_4N_3$, chloro-dihydroergotamine
- R=$C_{19}H_{24}O_4N_3$, chloro-dihydroergocristine
- R=$OCH_3$, iodo-dihydro-lysergic acid methyl ester
- R=$C_{17}H_{20}O_4N_3$, iodo-dihydroergotamine
- R=$C_{19}H_{24}O_4N_3$, iodo-dihydroergocristine The new halogeno-derivatives are very stable, well crystallised compounds which give colour reactions with Keller's reagent which is characteristic for the ergotalkaloids. The compounds may serve for therapeutic purposes and as intermediate compounds for the preparation of therapeutic substances.

The following examples illustrate how the invention may be carried out in practice, but these examples are in no way limitative.

EXAMPLE 1

*Preparation of brom-ergotamine*

500 mg. ergotamine which has been dried in a high vacuum are dissolved in 45 cc. dioxane at 65° C. and a solution of 185 mg. brom-succinimide in 10 cc. dioxane at 65° C. added thereto. The mixture which is kept for 5 minutes at 70° C. becomes immediately coloured in a brownish-yellow shade and within 1 minute becomes black-red with a slight turbidity. After the addition of 200 cc. chloroform and washing with sodium bicarbonate solution in a separating funnel and drying with sodium sulphate and evaporation to dryness of the organic layer a residue is obtained containing a crude reaction product which is then subjected to chromatographic separation. For this purpose it is dissolved in 5 cc. of absolute chloroform and the solution poured onto a column of 40 g. aluminium oxide, and the chromatogram developed with absolute chloroform. From a uniform zone slightly luminous in ultra-violet light, there is obtained 331 mg. of colourless oil in the filtrate. After evaporation to dryness the residue is crystallised from 90% acetone and 260 mg. of rectangular plates of melting point 197–198° C. are obtained. By re-crystallisation from methanol 5 or 6 cornered leaflets are obtained, melting point 207–208° C.

$[\alpha]_D^{20} = -163°$ (chloroform).

Keller reaction: the same as for ergotamine.

The new brom-ergotamine does not fluoresce in ultraviolet light in methanol solution.

The analytical figures agree very well indeed with those required for the empirical formula $C_{33}H_{34}O_5N_5Br$.

EXAMPLE 2

Preparation of brom-ergocristine 200 mg. ergocristine are treated at 65° C. in 25 cc. dioxane with 70 mg. brom-succinimide in 10 cc. of the same solvent at the same temperature for 5 minutes. By working up in the manner described in Example 1 and using a column of 20 g. aluminium oxide, 132 mg. of colourless oil are obtained.

After recrystallisation from benzene, platelets are obtained containing 2 molecules of benzene of crystallisation.

Melting point 178–183° C.

$[\alpha]_D^{20}$ for the preparation dried in a high vacuo $-189°$ (chloroform).

Keller's reaction: pure blue, and within 30 seconds changes to dirty brown.

The product does not fluoresce in ultra-violet light in methanol solution.

The analytical figures show a very good agreement with the empirical formula $C_{35}H_{38}O_5N_5Br$.

EXAMPLE 3

Preparation of brom-ergocornine

A solution of 200 mg. ergocornine in 15 cc. dioxane at 65° C. is treated with 65 mg. brom-succinimide in 10 cc. of warm dioxane and the red coloured mixture heated for a further 5 minutes at 70° C. and worked up as described in Example 1.

The chromatographic separation of the crude product with 20 g. aluminium oxide furnishes a uniform quickly moving zone only slightly luminous in ultra-violet light. By evaporation of the filtrate there is obtained 113 mg. of colourless oil which on recrystallisation from chloroform yields 92 mg. of prisms pointed at both ends, or very long six-cornered plates containing 2 molecules of crystallisation of the solvent.

Melting point 187–189° C.

$[\alpha]_D^{20}$ of the preparation after drying in a high vacuo $-215°$ (chloroform).

Keller's reaction: first pure blue; after 10 seconds violet-blue; after 15 seconds violet; after 45 seconds brown-violet. Final colour after 2½ minutes, brown.

The brom-ergocornine does not fluoresce in ultra-violet light in methanol solution.

The analytical data show very good agreement with the empirical formula $C_{31}H_{38}O_5N_5Br$.

EXAMPLE 4

Preparation of bromo-ergocorninine 200 mg. ergocorninine are dissolved in 20 cc. dioxane at 65° C. and treated with a solution of 74 mg. brom-succinimide in 10 cc. warm dioxane. After treatment for 5 minutes at 70° C. the crude product is isolated as described in Example 1 and subjected to chromatographic adsorption with 20 g. aluminium oxide. By developing the chromatogram with absolute chloroform a uniform zone quickly going into the filtrate is obtained, this zone being only slightly luminous in ultra-violet light. By evaporation of the filtrate there is obtained 145 mg. colourless oil, which when crystallised from benzene gives 6-cornered leaflets which contain ½ molecule of benzene of crystallisation.

Melting point: 229° C.

From methanol, in which brom-ergocorninine is sparingly soluble, there were obtained long white needles with 1 molecule of methanol of crystallisation, which melted already at 190–198° C.

$[\alpha]_D^{20}$ of the dry brom-ergocorninine: $+425°$ (chloroform).

Keller reaction: the same as with ergocorninine.

The brom-ergocorninine does not fluoresce in ultra-violet light in methanol solution.

The analytical figures show a good agreement with the empirical formula $C_{31}H_{38}O_5N_5Br$.

EXAMPLE 5

Preparation of brom-ergobasine

A solution of 200 mg. ergobasine in 20 cc. dioxane at 60° C. is treated with 130 mg. brom-succinimide in 10 cc. dioxane, whereby a black-red precipitate immediately ensues. The mixture is maintained for 5 minutes at 60° C., then shaken out with chloroform and saturated brine containing sodium bicarbonate and the chloroform-dioxane layer separated, dried with sodium sulphate and evaporated to dryness. The dry residue is chromatographically adsorbed on 20 g. aluminium oxide. For this purpose it is dissolved in the smallest possible quantity of chloroform to which 5% of alcohol has been added, the solution poured onto the aluminium oxide column and the chromatogram developed first with chloroform and then with chloroform to which 1% of alcohol has been added. With the latter solvent the uniform zone having a violet fluorescence in ultra-violet light soon reaches the filtrate. By evaporation of the latter there remains 136 mg. of slightly reddish oil, which by recrystallisation from chloroform furnishes 72 mg. of slightly truncated rods containing 1 molecule of chloroform of crystallisation which sinters at about 110° C. and melts at 122–128° C.

$[\alpha]_D^{20}$ of the brom-ergobasine free from solvent of crystallisation gave $-16°$ (pyridine).

Keller's reaction: as ergobasine.

The methanol solution of the brom-ergobasine fluoresces in a violet colour in ultra-violet light with the same intensity as a solution of ergobasine in the same solvent. The analytical figures correspond closely to the empirical formula $C_{19}H_{22}O_2N_3Br$.

EXAMPLE 6

Preparation of bromo-lysergic acid methylester 115 mg. of lysergic acid methylester are dissolved in 12 cc. of dioxane at 65° C. and treated with a solution of 85 mg. brom-succinimide in 5 cc. dioxane at the same temperature, whereby a reddish-black precipitate separates out. The mixture is heated a further 3 minutes at 60–65° C. and thereupon the crude reaction products are isolated as in Example 1. These are subjected to chromatographic separation with 20 g. aluminium oxide. On development of the chromatogram with absolute chloroform 2 zones are formed, namely, one having only a slight luminosity in ultra-violet light quickly passing into the filtrate and the second a somewhat more slowly moving zone fluorescent in ultra-violet light which consists of some of the starting material.

The filtrate containing the first zone is evaporated to dryness and the residue thus obtained recrystallised from benzene. Crystals were obtained containing two molecules of benzene of crystallisation.

Melting point 177–178° C.

$[\alpha]_D^{20}$ of the preparation free from solvent of re-crystallisation +41° (chloroform).

Keller's reaction: as lysergic acid methylester.

In methanol solution in ultra-violet light brom-lysergic acid methylester has a very weak fluorescence.

The analytical figures show a close agreement with the empirical formula $C_{17}H_{17}O_2N_2Br$.

EXAMPLE 7

*Preparation of bromo-lysergic acid-diethylamide*

A solution of 200 mg. lysergic acid diethylamide in 15 cc. dioxane at 40° C. is treated with 130 mg. brom-succinimide in 10 cc. of cold dioxane. The mixture immediately becomes red coloured with separation of a precipitate. It is kept at 40° C. for another 10 minutes and thereupon the crude product is isolated as described in Example 1.

With the chromatographic method with 20 g. of aluminium oxide, dissolved in absolute benzene, there is obtained a uniform slightly luminous zone which rapidly passes into the filtrate. On evaporation this yields 100 mg. of oil which can be crystallised from ether, from which then colourless spears are obtained. The crystals begin to sinter at about 105° C. and melt very indefinitely at about 123° C.; they do not contain solvent of crystallisation.

$[\alpha]_D^{20} = +53°$ (chloroform).

Keller's colour reaction: as for lysergic acid-diethylamide.

Brom-lysergic acid-diethylamide does not fluoresce in methanol solution in ultra-violet light.

The analytical figures agree well with the empirical formula $C_{20}H_{24}ON_3Br$.

EXAMPLE 8

*Preparation of bromo-dihydrolysergic acid-methylester*

284 mg. dihydrolysergic acid-methylester are dissolved in 50 cc. of hot carbon tetrachloride and to the warm solution at 55° C., 385 mg. brom-succinimide are added. It is shaken vigorously for 5 minutes and thereupon the brown solution and the precipitate are washed with sodium bicarbonate solution.

After filtering the carbon tetrachloride solution and drying it with sodium sulphate and evaporation to dryness, there are obtained 250 mg. brown oil which is subjected to chromatographic separation with 25 g. aluminium oxide. On development of the chomatogram with absolute chloroform there are first obtained in the filtrate 42 mg. of red non-crystallisable oil and thereupon 145 mg. of the bromo-dihydrolysergic-acid-methylester, which after evaporation of the filtrate is obtained from methanol in many-surfaced straight cut prisms. Melting point 214–215° C. The compound can be sublimed in a high vacuo at 180–190° C.

$[\alpha]_D^{20} = -92°$ (chloroform).

Keller's colour reaction: pure blue.

The analytical figures agree well with the empirical formula $C_{17}H_{19}O_2N_2Br$.

EXAMPLE 9

*Preparation of brom-dihydroergotamine*

200 mg. dihydroergotamine are dissolved in 30 cc. of cold dioxane and treated with a solution of 57 mg. N-bromo-acetamide in 10 cc. of cold dioxane. At first there is no visible reaction, but on standing at room temperature the mixture becomes gradually yellow within 2 minutes, orange after 5 minutes and orange-brown after 15 minutes. Thereupon the reaction product is isolated as described in Example 1 and chromatographed with 20 g. aluminium oxide. By development of the chromatogram with absolute chloroform there is obtained a uniform zone in the filtrate which is only slightly luminous in ultra-violet light and which amounts to 78 mg. of colourless oil. This is evaporated to dryness and the residue crystallised from 90% acetone. 47 mg. rectangular leaflets of melting point 191–196° C. are obtained. The crystals lose 10% of their weight on drying in a high vacuo at 100° C.

$[\alpha]_D^{20}$ of the bromo-dihydroergotamine dried in a high vacuum −87° (pyridine).

Keller's colour reaction: pure blue.

The analytical figures agree well with the empirical formula $C_{33}H_{36}O_5N_5Br$.

EXAMPLE 10

*Preparation of brom-dihydroergocristine*

200 mg. dihydro-ergocristine are dissolved in 15 cc. of dioxane at 70° C. and treated with 148 mg. bromo-phthalimide in 10 cc. of warm dioxane. The red solution is maintained for another 5 minutes at 70° C. and the crude reaction product worked up as in Example 1 and chromatographed with 20 g. aluminium oxide.

The development of the chromatogram with absolute chloroform yields 18 mg. of a red non-crystallising oil, and thereupon 99 mg. of bromo-dihydro-ergocristine. The latter crystallizes from benzene in boat-shaped plates and in truncated polyhedral prisms which contain 2 molecules of benzene of crystallisation. Melting point 187–190° C.

$[\alpha]_D^{20}$ of the bromo-dihydroergocristine free from solvent −78° (pyridine).

Keller's colour reaction: pure blue.

The analytical figures agree well with the empirical formula $C_{35}H_{40}O_5N_5Br$.

EXAMPLE 11

*Preparation of iodo-dihydro-ergocristine*

500 mg. dihydroergocristine are dissolved in 25 cc. of dioxane and mixed at 60° C. with a warm solution of 216 mg iodosuccinimide (1.5 mol), dissolved in 10 cc. of dioxane. The clear brown-orange solution is heated for further 5 minutes at 60–65° C., thereupon 50 cc. of chloroform are added thereto and the solution thus obtained washed with sodium carbonate. After drying the chloroform dioxane solution of the raw product with sodium sulphate, the solution is evaporated in vacuo to dryness and the remaining residue chromatographed with 50 g. of aluminium oxide. By developing the chromatogram with absolute chloroform there are first obtained 100 mg. of a red non-crystallisable oil and then there are eluated 366 mg. of an oily compound, that after crystallisation from benzene gives 370 mg. (air-dried) of spherical aggregates of orange-red uncharacteristical crystals, or by slow crystallisation plates with 6 edges to irregular prisms showing a plurality of surfaces.

Melting point, 187–192° C.; 185–190° C.

$[\alpha]_D^{20} = -70°$ (in pyridine).

The crystallisate contains 1 mol of crystal benzene and loses by drying in high vacuo at 100° C. 14% of its weight.

$[\alpha]_D^{20}$ of high vacuo dried substance $-82°$ (pyridine).

*Analysis.*—$C_{35}H_{40}O_5N_5I$, calculated: C 56.97, H 5.47, N 9.50%. Found: C 57.67, H 5.39, N 9.13; C 57.62, H 5.45, N 9.05.

Keller's colour reaction: reddish blue.

EXAMPLE 12

*Preparation of iodo-dihydro-lysergic acid methyl ester*

460 mg. of dihydrolysergic acid methylester dried in high vacuo are dissolved in 15 cc. of cold dioxane and treated with a solution of 400 mg. iodo-succinimide (1.1 mol), dissolved in 15 cc. of dioxane, whereby the mixture becomes yellow. The solution is left standing at room temperature, first for 20 minutes and then heated for 15 minutes at 65–70° C.

To the solution are then added 50 cc. of chloroform, the solution is washed with sodium bicarbonate solution in a shaking funnel and the chloroform-dioxane solution of the raw product is dried with sodium sulphate and evaporated to dryness in vacuo. For purification the raw product is subjected to chromatographic adsorption analysis with 50 g. of aluminium oxide. By developing the chromatogram with absolute chloroform are first obtained 80 mg. of red oil and thereon 450 mg. of a product that by slow crystallisation from a mixture of chloroform and ether crystallises in form of needles, partly in small bundles, whereas by rapid crystallisation an uncharacteristical colourless crystallisate of melting point 242–243°; 246–247° is obtained.

The iodo-dihydro-lysergic acid methylester can easily be sublimated without decomposition in high vacuo at 210° C. M. P. of the sublimate, 247–249° C.

$[\alpha]_D^{20} = -130°$ (in pyridine).

*Analysis.*—$C_{17}H_{19}O_2N_2I$, calculated: C 49.75, H 4.67, N 6.83. Found: C 49.89, H 4.30, N 6.22; C 50.11, H 4.13, N 6.66.

One part of iodo-dihydro lysergic acid methyl ester dissolves at boiling-heat in about 600 parts of methanol, 150–200 parts of chloroform or 300 parts of benzene. Colour reaction according to Keller: reddish blue.

EXAMPLE 13

*Preparation of chlorodihydro-ergocristine*

250 mg. of dihydro-ergocristine are dissolved in 40 cc. of dioxane and treated at room temperature with 114 mg. (1.3 mol) of N-chlorobenzoic acid sulfimide dissolved in 10 cc. of dioxane. The yellow solution thus obtained is allowed to stand 1 hour at room temperature. Then 100 cc. of chloroform are added thereto and the solution washed with 2n-sodium carbonate solution in the separating funnel. After drying with sodium sulphate the chloroform-dioxane solution is evaporated to dryness in vacuo and the raw product subjected to chromatographic adsorption analysis with 25 g. of aluminium oxide. By developing the chromatogram with chloroform containing 1% of ethanol, still 76 mg. of oil will be obtained. The parts more closely adhering to the column are by-products giving no Keller's colour reaction. These 76 mg. first washed out are a mixture of chloro dihydro-ergocristine with some starting material which it is very difficult to separate. For the preparation of pure chloro dihydro-ergocristine this mixture is chromatographed a second time with 10 g. of aluminium oxide. By developing the chromatogram with absolute chloroform it is possible to separate pure chlorodihydro-ergocristine which crystallizes from benzene in on both sides pointed prisms containing 1 mol of crystal benzene and melting at 172–175° C.

$[\alpha]_D^{20} = -70°$ (in pyridine).

Formula: $C_{35}H_{40}O_5N_5Cl$, calculated: N 10.85%; found: 10.19%.

Keller's colour reaction: pure blue.

EXAMPLE 14

*Preparation of chlorodihydro-ergotamine*

500 mg. of dihydro-ergotamine dried in high vacuo are dissolved in 40 cc. of warm dioxane. At room temperature a solution of 317 mg. (1.3 mol) of 2.6-dichloro-4-nitro-N-chloracetanilide in 10 cc. of dioxane are added. The light brown colored solution is allowed to stand for 1 hour at room temperature, diluted with 100 cc. of chloroform and washed with 2n sodium carbonate solution. The separated chloroform-dioxane solution is dried and evaporated to dryness in vacuo. The residue is then subjected to the chromatographic adsorption method with a column of 40 g. of aluminium oxide. Where developing the chromatogram with chloroform containing ½% of ethanol, first 270 mg. of 2.6-dichloro-4-nitroacetanilide are washed out. By developing with chloroform containing 0.75% of ethanol, 320 mg. of chlorodihydro-ergotamine can be eluated. The new compound crystallizes from chloroform or from 90% acetone in straight cut plates melting from 176–178° C. and containing solvent of crystallization. Dried during 2 hours in high vacuo at 100° C., the chlorodihydro-ergotamine shows an optical rotation $[\alpha]_D^{20} = -81°$ (in pyridine).

Keller's colour reaction: pure blue.

The analytical figures correspond to the empirical formula $C_{33}H_{36}O_5N_5Cl$.

EXAMPLE 15

*Preparation of iodo-dihydro-ergotamine*

To a solution of 500 mg. of dihydro-ergotamine in 25 cc. of dioxane is added a solution of 260 mg. of iodo-succinimide (1.3 mol) in 10 cc. of dioxane. The solution is left for 10 minutes at room temperature and hereupon for 10 minutes at 65° C. After dilution with 100 cc. of chloroform, washing with a sodium carbonate solution, separating and drying the chloroform-dioxane solution with sodium sulphate, the former is evaporated in vacuo to dryness. The residue is subjected to the chromatographic adsorption method on 40 g. of aluminium oxide. On development with chloroform containing ½% ethanol first 40 mg. of a red non-crystallisable oil are obtained and hereupon 406 mg. of an uncolored oil. From the latter iodo-dihydro-ergotamine is isolated by crystallisation from 90% acetone. The crystals are straight cut plates melting from 179–181° C. and contain crystallising solvent. The optical rotation $[\alpha_D^{20}]$ of this substance, when dried at 100° C. in high vacuo, is $-90°$ (in pyridine).

Iodo-dihydro-ergotamine gives the same Keller's colour reaction as dihydro-ergotamine and its empirical formula $C_{33}H_{36}O_5N_5I$ has been proved by analysis: Calculated: C 55.83; H 5.12; N 9.88%. Found: C 56.01; H 5.52; N 9.43%.

EXAMPLE 16

*Preparation of iodo-ergotamine*

500 mg. of ergotamine dried in high vacuo are dissolved in 30 cc. of dioxane and mixed with a solution of 260 mg. (1.3 mol) of iodo-succinimide in 10 cc. of dioxane. The orange colored solution is allowed to stand at ordinary temperature during 15 minutes, whereby the solution becomes turbid. After addition of 100 cc. of chloroform, the mixture is shaken with a sodium carbonate solution, the chloroform dioxane solution separated, dried with sodium sulphate and evaporated to dryness in vacuo. The chromatographic treatment of the residue is carried out with 40 g. of aluminium oxide and the chromatogram developed first with absolute chloroform, whereby traces of yellow by-products are separated. On subsequent elution with chloroform containing ½% ethanol iodo-ergotamine is washed out. This elution is continued until a zone, which in ultraviolet light shows an intense violet lumination, begins to be washed out. From the chloroform-ethanol mixture containing the iodo-ergotamine which is not luminous in ultraviolet light 260 mg. of pure iodo-ergotamine are obtained by crystallisation from 90% acetone. The crystals are straightly cut plates, melting at 174° C. with decomposition and containing crystal solvent.

Iodo-ergotamine gives the Keller's colour reaction like ergotamine, possesses an optical rotation, when dried in high vacuo at 100° C., of $[\alpha_D^{30}] = -156°$ (in chloroform).

The empirical formula $C_{33}H_{34}O_5N_5I$ is confirmed by analysis: Calculated: C 55.59; H 4.85; N 9.90%. Found: C 56.29; H 5.41; N 9.92%.

What we claim is:

1. A process for the manufacture of a halogenated derivative of a compound of the lysergic acid series wherein the halogen atom is bound to the nitrogen atom of the indol ring and the lysergic acid skeleton is otherwise unaltered, which comprises treating a compound of the lysergic acid series wherein the lysergic acid skeleton is unaltered, with a halogen compound selected from the group consisting of N-halogenated amides and imides of carboxylic and sulfonic acids in an inert solvent reaction medium.

2. A process according to claim 1, wherein the solvent is dioxane.

3. A process according to claim 1, wherein the compound of the lysergic acid series is a dihydro-ergot alkaloid and the product is a halogenated derivative of such dihydro-ergot alkaloid wherein the halogen is bound to the indol nitrogen.

4. A process for the manufacture of brom-ergotamine, wherein bromine is bound to the indol nitrogen, which comprises treating ergotamine with bromo-succinimide in dioxane.

5. A process for the manufacture of brom-ergocristine, wherein bromine is bound to the indol nitrogen, which comprises treating ergocristine with bromo-succinimide in dioxane.

6. A process for the manufacture of brom-ergocornine, wherein bromine is bound to the indol nitrogen, which comprises treating ergocornine with brom-succinimide in dioxane.

7. A halogenated compound of the lysergic acid series wherein the halogen atom is bound to the nitrogen atom of the indol ring and the lysergic acid skeleton is otherwise unaltered.

8. A halogenated ergot alkaloid wherein the halogen atom is bound to the indol nitrogen.

9. A halogenated dihydro ergot alkaloid wherein the halogen atom is bound to the indol nitrogen.

10. Brom-ergotamine, the bromine being bound to the indol nitrogen.

11. Brom-ergocristine, the bromine being bound to the indol nitrogen.

12. Brom-ergocornine, the bromine being bound to the indol nitrogen.

ALBERT HOFMANN.
FRANZ TROXLER.

No references cited.